United States Patent [19]

Miyakawa et al.

[11] E Patent Number: Re. 32,330

[45] Reissued Date of Patent: Jan. 13, 1987

[54] METHOD OF MAINTAINING THE CORRECT CONDITIONS OF AN ELECTROPHOTOGRAPHICALLY DUPLICATED IMAGE

[75] Inventors: Seiichi Miyakawa; Susumu Tatsumi; Koji Sakamoto, all of Tokyo, Japan

[73] Assignee: Ricoh Co., Ltd., Tokyo, Japan

[21] Appl. No.: 552,868

[22] Filed: Nov. 18, 1983

Related U.S. Patent Documents

Reissue of:

[64] Patent No.: 4,215,930
Issued: Aug. 5, 1980
Appl. No.: 880,175
Filed: Feb. 22, 1978

U.S. Applications:

[63] Continuation of Ser. No. 405,379, Aug. 5, 1982, abandoned.

[30] Foreign Application Priority Data

Feb. 23, 1977 [JP] Japan ..... 52-18058
Feb. 23, 1977 [JP] Japan ..... 52-19908

[51] Int. Cl.[4] ..... G03G 15/04; G03G 15/06

[52] U.S. Cl. ..... 355/14 D; 118/668; 355/14 E; 430/30

[58] Field of Search ..... 355/3 R, 3 DD, 14 E, 355/14 D; 118/646, 651, 665, 668, 691, 693; 430/30

[56] References Cited

U.S. PATENT DOCUMENTS

| | | | |
|---|---|---|---|
| 3,438,705 | 4/1969 | King | 355/14 D X |
| 3,788,739 | 1/1974 | Corrale | 355/3 R X |
| 3,815,988 | 6/1974 | McVeigh et al. | 355/3 R |
| 4,050,806 | 9/1977 | Miyakawa et al. | 355/14 D |
| 4,082,445 | 4/1978 | Steiner | 355/14 D |
| 4,358,520 | 11/1982 | Hirayama | 430/54 |

FOREIGN PATENT DOCUMENTS 40-13903 7/1965 Japan .

*Primary Examiner*—Fred L. Braun
*Attorney, Agent, or Firm*—Oblon, Fisher, Spivak, McClelland & Maier

[57] ABSTRACT

A method of maintaining the correct conditions of an electrophotographically duplicated image, which uses a reference plate having at least a dark-tone area and a light-tone area and in which signals associated with the reference plate are detected and synthesized to control the duplicating process conditions such as developing bias potential, charge, exposure and of the optical system so that an optimum image may be produced.

12 Claims, 8 Drawing Figures

METHOD OF MAINTAINING THE CORRECT CONDITIONS OF AN ELECTROPHOTOGRAPHICALLY DUPLICATED IMAGE

Matter enclosed in heavy brackets [ ] appears in the original patent but forms no part of this reissue specification; matter printed in italics indicates the additions made by reissue.

*This application is a continuation of U.S. application Ser. No. 405,379, filed Aug. 5, 1982 now abandoned, which in turn was a reissue application of U.S. Pat. No. 4,215,930.*

BACKGROUND OF THE INVENTION

The present invention relates to electrophotography and, more particularly, to a method of maintaining the optimum conditions of an electrophotographically duplicated image, in which all the conditions of the duplicating or copying process are automatically changed to produce a correct duplicated image.

For the purpose of automatically correcting the variation from the initial conditions to set the optimum conditions of the duplicating process, it is hertofore a common practice for the duplicator to place a reference copy having a predetermined reflection factor on the contact glass section and detect the surface potential of a photosensitive medium corresponding to the above-mentioned reference copy thereby determining the bias potential at the developer section. Such a practice is very effective when the copy to be duplicated is of a uniform tone or, in other words, when the background of the copy is of one tone; however, when the copy has a colored background as in the case of a colored copy, it cannot necessarily produce a desirable duplicated image because the user must correct the exposure condition and so forth on the so-called sixth sense. In another conventional practice, the quantity of light reflected from the above-mentioned reference copy is detected and then the various conditions of the duplicating process are set according to the above-mentioned quantity of reflected light; this practice, however, can only correct the contamination condition of the optical system and still has the above-mentioned defects.

BRIEF SUMMARY OF THE INVENTION

It is an object of the present invention to provide a method of maintaining the proper state of an electrophotographically duplicated image, which can obtain a proper duplicated image by automatically correcting the bias potential even when the copy to be duplicated has a colored background.

It is another object of the present invention to provide a method of maintaining the proper state of an electrophotographically duplicated image, which can prevent production of a duplicated image impossible to read by setting the upper limit of the bias potential.

It is still another object of the present invention to provide a method of maintaining the proper state of an electrophotographically duplicated image, which can incorporate such conditions as electric charge, exposure and the presence of flare into the initial conditions.

DETAILED DESCRIPTION OF THE PREFERRED EMBODIMENTS

Figure 1:
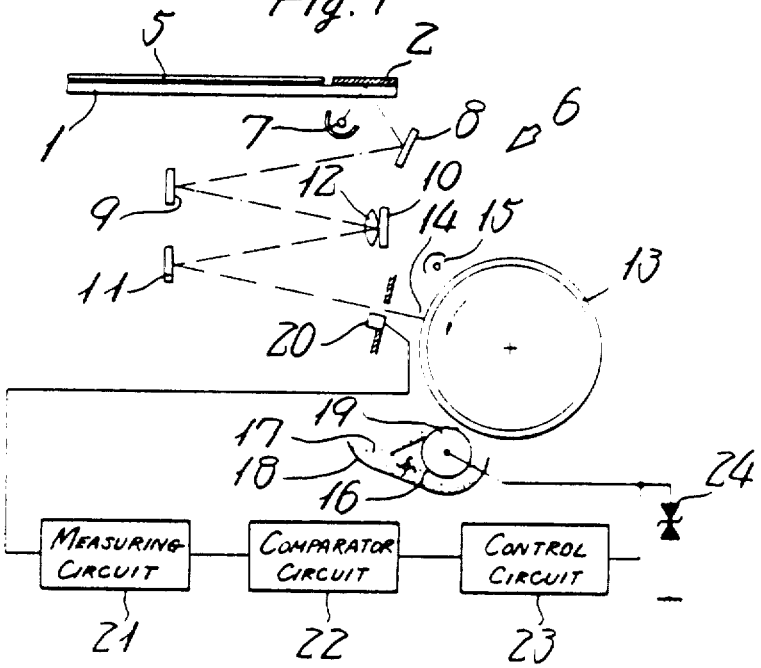
FIG. 1 is a schematical side view of an apparatus for use in the first preferred embodiment of the present invention.

The first preferred embodiment of the present invention will be hereinafter described with reference to the accompanying drawings, especially to FIGS. 1 to 4.

Reference numeral 1 designates a contact glass plate on which copies to be duplicated are to be placed. A reference plate 2 is provided on the upper surface end of the contact glass plate 1. The reference plate 2 has a dark-tone or shaded area and a light-tone or unshaded area thereon. An original copy 5 to be duplicated is placed on the contact glass plate 1.

Under the contact glass plate 1, there is provided an optical system 6 for scanning the entire surface of the contact glass plate 1. The optical system 6 is composed of a lamp 7, reflecting mirrors 8, 9, 10 and 11, and a lens 12. The optical path formed by the optical system 6 terminates at the exposure portion 14 of a photosensitive medium 13 wound around a drum. A charger 15 for electrifying the latent image retainer of the photosensitive medium 13 is provided at the pre-process side or upstream of the exposure portion 14 of the photosensitive medium 13. A developing device 16 is provided at the post-process side or downstream of the exposure portion 14 of the photosensitive medium 13. The developing device 16 consists of a developer tank 18 containing a developer 17 and of a developing roller 19 for conveying the developer 17 toward the photosensitive medium 13 in the form of a layer having a predetermined width. The developer roller 19 is formed of a magnet fixedly provided inside and a non-magnetic cylindrical sleeve which rotates about the fixed magnet.

One or a plurality of photo-electric conversion elements 20 are provided in the vicinity of the exposure portion 14 of the photosensitive medium 13. The photo-electric conversion elements 20 are connected to an actinometer circuit 21, a comparator circuit 22 and a voltage output circuit 23 in series. A zener diode 24 is provided at the output side of the output circuit 23 for maintaining the output voltage thereof.

Figure 4:
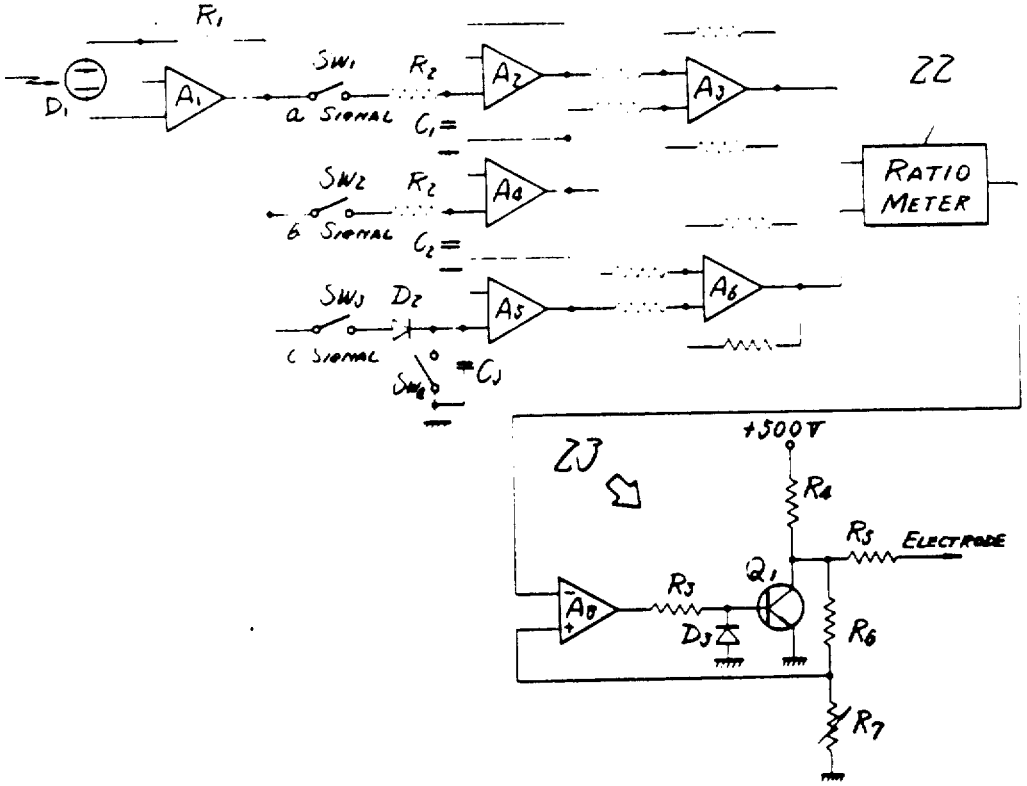
FIG. 4 is an electric circuit diagram of the apparatus shown in FIG. 1.
Figure 5:
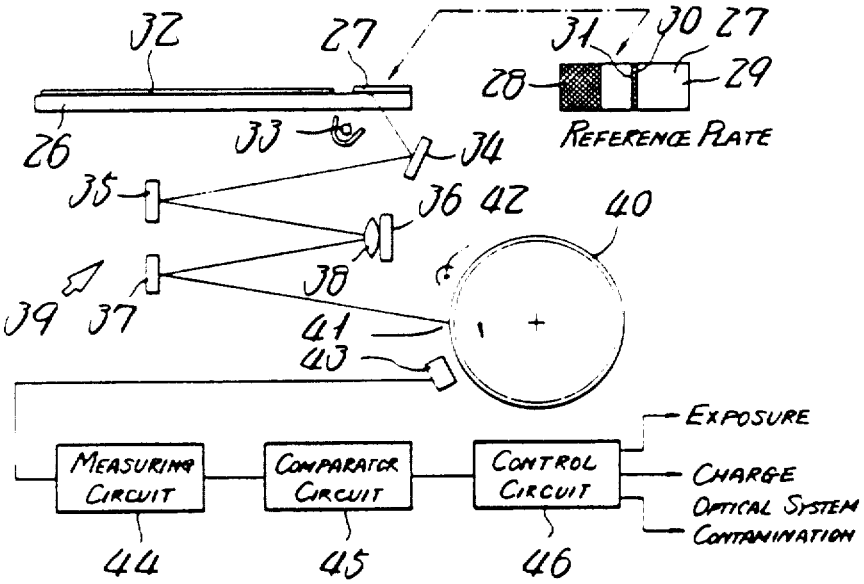
FIG. 5 is a schematical side view of an apparatus for use in the second preferred embodiment of the present invention.

The electric circuit of the apparatus thus formed is shown in FIG. 4 in detail. The photo-electric conversion element 20 utilizes a photo diode $D_1$ connected to switches $SW_1$, $SW_2$ and $SW_3$ through a resistor $R_1$ and an amplifier $A_1$. The switches $SW_1$, $SW_2$ and $SW_3$ form three circuits for signal a, signal b and signal c, respectively. The switch $SW_1$ is used for obtaining "signal a" corresponding to the dark-tone area 3 of the reference plate 2, the switch $SW_2$ for obtaining "signal b" corresponding to the light-tone area 4 of the reference plate 2, and $SW_3$ for obtaining "signal c" corresponding to the portion of the original copy 5 where the reflection factor is greatest. These switches $SW_1$, $SW_2$ and $SW_3$ are adapted to instantaneously close at predetermined times, respectively. The switch $SW_1$ is connected to a sample hold circuit $A_2$ through a resistor $R_2$ and a capacitor $C_1$. The sample hold circuit $A_2$ is connected to the comparator circuit or ratio meter 22 through a subtracting circuit $A_3$. The switch $SW_2$ is connected to a sample hold circuit $A_4$ through a resistor $R_2$ and a capacitor $C_2$. The output side of the sample hold circuit $A_4$ is connected to a subtracting circuit $A_6$ and the above-mentioned subtracting circuit $A_3$. The switch $SW_3$ is connected to a peak hold circuit $A_5$ through a diode $D_2$, a capacitor $C_3$ and a switch $SW_4$ for unlocking signal c. The peak hold circuit $A_5$ and the sample hold circuit $A_4$ are both connected to the subtracting circuit $A_5$, which is connected to the comparator circuit 22.

Besides, the comparator circuit 22 is connected to an amplifier $A_8$ which is connected to the base of a transistor $Q_1$ through a resistor $R_3$ and a diode $D_3$. The emitter of the transistor $Q_1$ is grounded, the collector thereof being connected to a power supply terminal 25 through a resistor $R_4$ and also to the above-mentioned developing roller 19 through a resistor $R_5$. A resistor $R_6$ and a variable resistor $R_7$ are connected to the collector of the transistor $Q_1$. These resistors $R_6$ and $R_7$ are also connected, through the mid-point therebetween, to the input side of the above-mentioned amplifier $A_8$.

Figure 2:
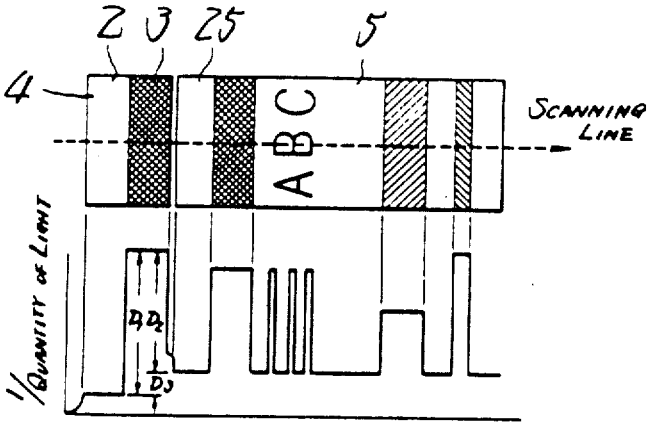
FIG. 2 is a diagram showing the characteristics of the measured output signal in conjunction with the first preferred embodiment.
Figure 3:
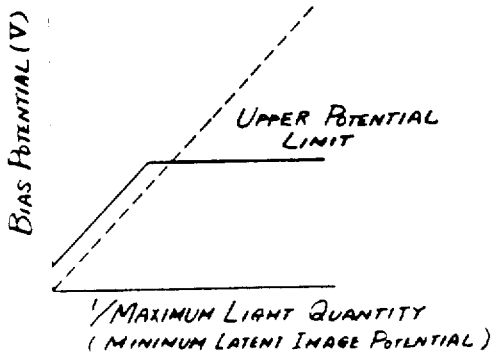
FIG. 3 is a diagram showing the relationship between the quantity of light and the bias potential in conjunction with the first preferred embodiment.

In operation, light is reflected from the reference plate 2 and the copy 5 when they are scanned by the optical system 6. The quantities of light reflected from the reference plate 2 and the copy 5 are distributed as shown in FIG. 2. As shown, the quantities of light reflected from the light-tone area 4 and dark-tone area 3 of the reference plate 2 and from various portions of the copy 5 differ from one another. These quantities of light are detected by the photo-electric conversion element 20, being measured by the actinometer circuit 21 the output of which is fed to the comparator circuit 22. More particularly, the subtracting circuit $A_3$ outputs signal "b - a" and the subtracting circuit $A_6$ outputs signal "b - c." Thus, in the comparator circuit 22, the difference $D_1$ between the quantity of light reflected from the light-tone area 4 and that reflected from the dark-tone area 3 is compared with the difference $D_2$ between the quantity of light reflected from the dark-tone area 3 and that reflected from the area 25 of the copy 5 where the reflection factor is greatest; thus the comparator circuit 22 produces an output signal corresponding to the difference $D_3$ between the differences $D_1$ and $D_2$. According to the output of the comparator circuit 22, the voltage output circuit 23 gives a bias potential to the developing roller 19. Detection of the maximum reflection-factor area 25 is made by finding the portion of the copy 5 where the quantity of light reflected is greatest during the period from the time when the leading end of the copy 5 passes the photoelectric conversion element 20 and to the time when it is on the point of entering the developing section.

The bias potential is thus determined on the basis of the light quantity difference $D_3$ so that it may be set slightly higher than the minimum latent image potential. In this case, the bias potential is not determined from only the quantity of light reflected from the maximum reflection-factor area 25 of the copy 5. More particularly, the above-mentioned difference $D_1$ between the quantity of light reflected from the dark-tone area 3 of the reference plate 2 and that reflected from the light-tone area 4 of the reference plate is determined in consideration of the variations of the various characteristics and contamination of the photo-electric conversion element 20; the above-mentioned difference $D_2$ between the quantity of light reflected from either of the dark-tone area 3 and light-tone area 4 of the reference plate 2 (in this preferred embodiment, the dark-tone area 3) and that reflected from the maximum reflection-factor area 25 of the copy 5 is determined in consideration of the variations of the various characteristics and contamination of the photo-electric conversion element 20 so that the reflection factor of the surface of the copy 5 may be related to that of the reference plate 2; thus, the influence of the variations of the characteristics and contamination of the photo-electric conversion element 20 are approximately cancelled by obtaining the difference $D_3$ between the differences $D_1$ and $D_2$ and thereby an electric signal corresponding to the minimum latent image potential can be obtained in the state where the influence of the variations of various factors is minimized. Since the bias potential is determined in this manner, a clean duplicated image having an uncontaminated background portion can be automatically obtained even when the background portion of the original copy has a density in some degree as in the case of a colored copy. As a result, operation of the image control dial or the like is not required thereby eliminating failures caused by the operation based upon the so-called sixth sense.

When the original copy has a photograph throughout the surface, the quantity of light reflected from the maximum reflection-factor portion 25 tends to become small and, as a result, the bias potential also tends to increase. In this case, however, there is no possibility of producing a duplicated image having no contrast, because the upper limit of the bias potential is kept constant by the zener diode 24.

According to the above preferred embodiment of the present invention, the bias potential is determined in the following manner: first obtained is the difference between the quantity of light reflected from the dark-tone area of the reference plate 2 and that reflected from the light-tone area thereof, there being a predetermined difference between the density of the dark-tone area and that of the light-tone area; then obtained is the difference between the quantity of light reflected from either of the dark-tone area and light-tone area of the reference plate 2 and that reflected from the maximum reflection-factor portion 25 of the copy 5; and finally obtained is the difference between the above two differences, and the bias potential is determined according to this difference. According to the present invention, therefore, the developing bias potential suitable for the condition of the background portion of the copy 5 can be determined automatically and reliably by the use of simple and inexpensive mechanism under the condition where the variations of the various characteristics, contamination, .etc., of the photosensitive elements such as the photo-electric conversion element 20 have substantially no influence.

Next, the second preferred embodiment of the present invention will be hereinafter described with reference to FIGS. 5 to 8.

Reference numeral 26 designates a contact glass plate having a predetermined width and length. A reference plate 27 is provided on the end of the upper surface of the contact glass plate 26. The reference plate 27 has a reflecting surface which consists of a black area or dark-tone area 28 low in reflection factor and large in area, a white area or light-tone area 29 high in reflection factor and large in area, and a striped area 31 consisting of fine black stripes 30 and provided in the white area 29. Various kinds of copies 32 to be duplicated may be placed on the contact glass plate 26.

Under the contact glass plate 26, there is provided an optical system 39 composed of a lamp 33 having a length greater than the width of the contact glass plate 26, a plurality of reflecting mirrors 34, 35, 36 and 37, and a lens 38. The optical path formed by the optical system 39 terminates at the surface of a photosensitive medium 40 wound around a drum, so as to form an exposure section 41. A charger 42 is provided at the pre-process side or upstream of the exposure section 41. For the purpose of detecting the potential of an electrostatic latent image formed on the surface of the photosensitive medium 40, a surface potential detector 43 is provided at the post-process side or downstream of the exposure section. The surface potential detector 43 is connected to a measuring circuit 44, a comparator circuit 45 and a control circuit 46 in series.

Figure 6:
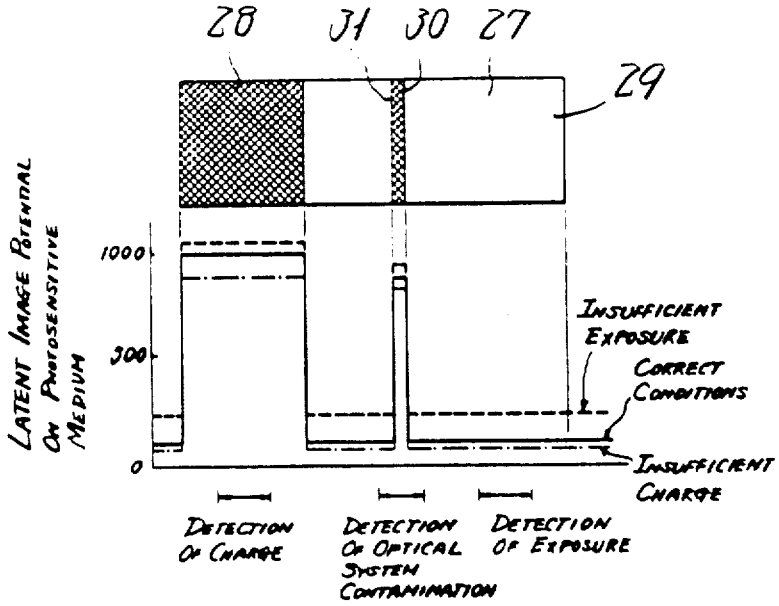
FIG. 6 is a diagram showing the relationship between the reference plate and the latent image potential of the photosensitive medium.

In operation, the photosensitive medium 40 is exposed to the light reflected from the reference plate 27 and, as a result, an electrostatic latent image is formed on the photosensitive medium 40. The solid line in FIG. 6 represents the correct condition of the potential of this electrostatic latent image; the portion of the latent image corresponding to the black area 28 is high in potential; the portion corresponding to the white area 29 is low in potential; and the portion corresponding to the striped area 31 is rather high in potential but not so high in potential as the portion corresponding to the black area 28. The dotted line in FIG. 6 shows how the potential of the above latent image is distributed when the exposure is insufficient; in this case, as shown, the potential is increased as a whole. The dot-dash line in FIG. 6 shows how the above latent image is distributed when the charge is insufficient; in this case, as shown, the potential is decreased as a whole. The condition of the latent image potential is converted into a predetermined signal by the measuring circuit 44, and the comparator circuit 45 compares this signal with a reference signal corresponding to the initial condition; according to the results, the control circuit 46 produces necessary control signals. More particularly: when the exposure alone is incorrect, the control circuit 46 generates signals for automatically correcting the voltage of the lamp 33, the width of the slit opening, and so on for giving an indication for correction; when the charge alone is insufficient, the control circuit 46 outputs signals for automatically increasing the voltage of the charger 42 or for giving an indication for correction; and when both the exposure and the charge are incorrect, the control circuit 46 outputs signals for correcting either of them so that correct values of them may be attained after several duplicating operations.

Figure 7:
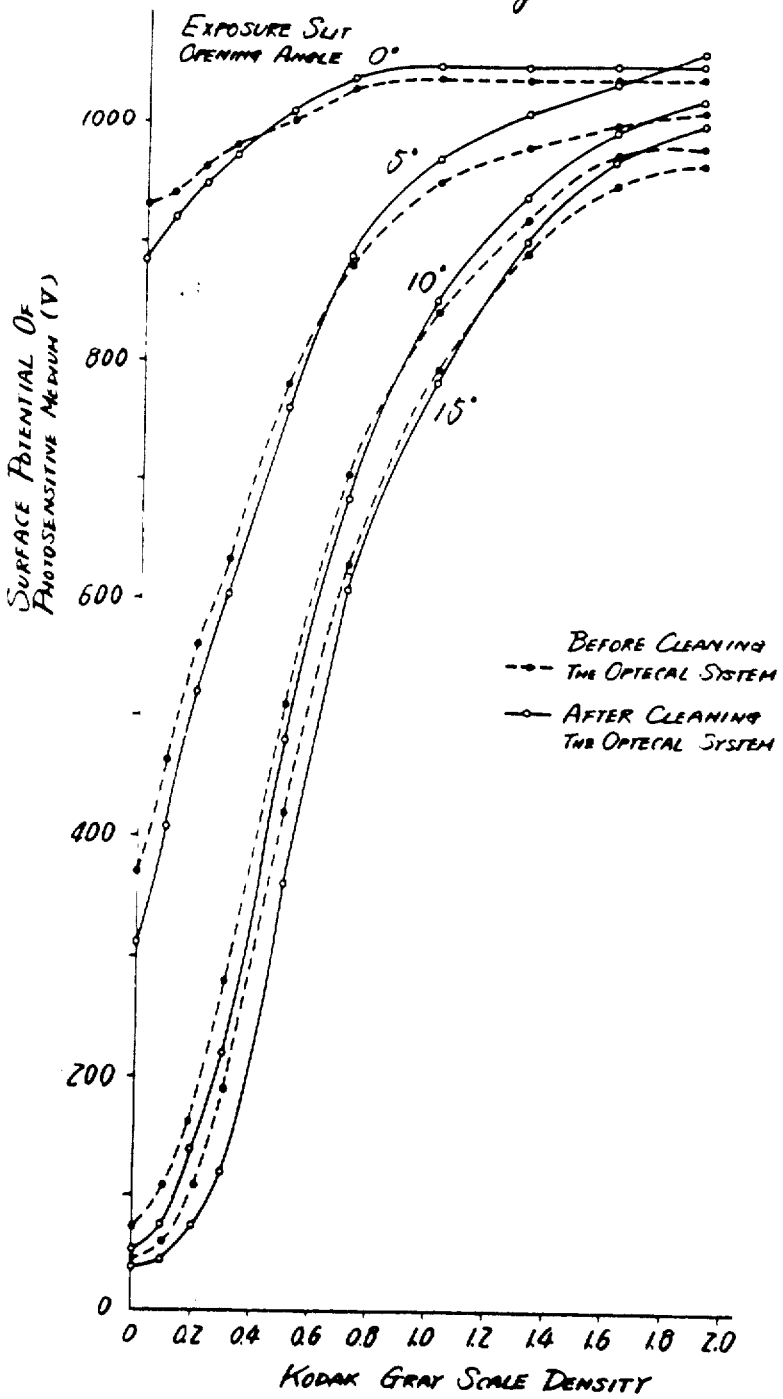
FIG. 7 is a diagram showing the relationship between the surface potential of the photosensitive medium and the density of the image obtained before and after the optical system is cleaned.

The behavior of the potential corresponding to the striped area 31 is shown in FIG. 7. In FIG. 7, the abcissa represents the density, or more particularly the Kodak Gray Scale Density, and the ordinate represents the surface potential of the photosensitive medium. Curves shown are obtained for exposure opening angles of 0°, 5°, 10° and 15° before and after cleaning the optical system 39, respectively. The condition "before cleaning the optical system" here means the condition in which the optical system 39 is contaminated with toner and dust after 40 to 50 thousand duplicating operations. Therefore, when the density is high, irregular reflection of light is caused by contamination; the irregularly reflected light tends to become flared and thereby the potential before cleaning becomes low while the potential after cleaning becomes high. When the density is low, the quantity of light is decreased by contamination; therefore the potential is high before cleaning and low after cleaning. Thus, contamination of the optical system 39 can be detected from the variation of the reference potential determined from the density (black or white) of the striped area 31. According to the detected results, the optical system 39 is automatically cleaned or an indication for cleaning is given.

Figure 8:
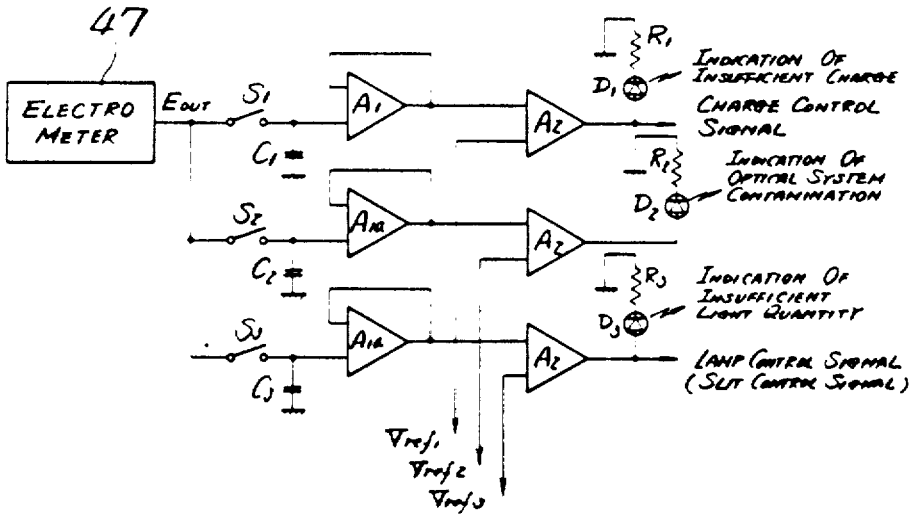
FIG. 8 is an electric circuit diagram of the apparatus shown in FIG. 5.

FIG. 8 shows an example of the electric circuit of the second preferred embodiment. Reference numeral 47 designates an electrometer connected to the surface potential detector 43. The electrometer 47 generates an output signal $E_{out}$ corresponding to 1/100 of the detected potential. The electrometer 47 is connected to switches $S_1$, $S_2$ and $S_3$ to which followers $A_1$, $A_{1a}$ and $A_{1b}$ are connected through potential hold capacitors $C_1$, $C_2$ and $C_3$, respectively. The followers $A_1$, $A_{1a}$, and $A_{1b}$ are connected to comparator circuits $A_2$, respectively. Signals corresponding to the reference level of charge $V_{ref1}$, the reference level of contamination $V_{ref2}$ and the reference level of exposure $V_{ref3}$ are inputted to these comparator circuits $A_2$, respectively.

The switch $S_1$ is adapted to instantaneously close when the black area 28 of the reference plate 27 is scanned. And the comparator circuit $A_2$ connected to the switch $S_1$ generates a charge control signal and, in addition, a light-emitting diode $D_1$ grounded through a resistor $R_1$ is used for indicating insufficient charge. The switch $S_2$ is adapted to instantaneously close when the striped area 31 of the reference plate 27 is scanned. The comparator circuit $A_2$ connected to the switch $S_2$ is coupled at its output side with a light-emitting diode $D_2$, which is grounded through a resistor $R_2$ and used for indicating contamination of the optical system. The switch $S_3$ is adapted to instantaneously close when the white area 29 of the reference plate 27 is scanned. The comparator circuit $A_2$ connected to the switch $S_3$ outputs a lamp control signal or a slit control signal to control the exposure, and a light-emitting diode $D_3$ grounded through a resistor $R_3$ is used for indicating an insufficient light quantity.

When the photosensitive medium 40 is made of material large in residual potential variation such as zinc oxide or organic photoconductive material, it is desirable to automatically perform the above-mentioned potential detection associated with the reference plate 27 for every duplicating operation. When the photosensitive medium 40 is made of material small in residual potential variation such as selenium, the above-mentioned potential detection associated with the reference plate 27 is normally not required and may be performed at the time of periodical maintenance by provision of a correct-operation maintaining switch. In this case, the reference plate 27 may be installed in the duplicator proper or may be placed on the contact glass plate 26. When the reference plate 27 is installed in the duplicator proper, it may be set at the side of the contact glass plate 26, while a long lamp 33 is used.

When the photosensitive medium 40 is made of material less subject to fatigue, detection of the potential of the latent image corresponding to the reference plate 27 is of course mainly intended for correcting the values of exposure and charge and for correcting changes with time as mentioned above; if the above-mentioned detection is performed for each duplicating operation, it can be effective for correcting the change of the quantity of light from the lamp 33 due to input voltage fluctuation, the change of charge responsible for the charger 42, the change of charge due to environment variation, etc. When the photosensitive medium 40 is made of material greatly subject to fatigue such as zinc oxide or organic photoconductive material or when the medium 40 is made of material somewhat subject to fatigue but high-speed duplication is to be performed, the above-mentioned detection is effective, in addition to the above-mentioned effects, for apparently eliminating fatigue by making the charging potential in light and dark zones constant.

According to the present invention, as mentioned above, the reference plate 27 having the black area 28, white area 29 and striped area 31 is used for forming an electrostatic latent image thereof; measurement of the potential of the above electrostatic latent image makes it possible to detect the conditions of exposure, charge and flare; the detected conditions are used to correct the exposure, charge and the contamination of the optical system to initial set conditions thereby obtaining a correct duplicated image.

Obviously many modifications and variations of the present invention are possible in the light of above teachings. It is therefore to be understood that within the scope of the appended claims the invention may be practiced otherwise than as specifically described herein.

What is claimed is:

1. A method for maintaining correct the developing bias voltage, charge, exposure and other conditions of a duplicated image in an electrophotographic process having charging and exposing steps for forming an electrostatic latent image on a photosensitive medium, which comprises setting a reference plate on a copy supporter together with an original copy so as to permit a duplicating process to proceed, said reference plate being provided with two areas dark-tone and light-tone having a predetermined density difference therbetween, detecting the difference between the quantities of light reflected from the dark-tone and light-tone areas of said reference plate to control each condition of the duplicating process so that a correct duplicated image may be obtained.

2. A method of maintianing correct the developing bias voltage conditions of an electrophotographically duplicated image using a reference plate provided with two areas dark-tone and light-tone having a predetermined density difference therebetween, which comprises detecting the difference between the quantities of light reflected from the dark-tone and light-tone areas of said reference plate, detecting the difference between the quantities of light reflected from either of the two areas of the reference plate and the quantity of light reflected from a maximum reflection-factor area of a copy to be duplicated, comparing said former difference with said latter difference to obtain the difference therebetween, and determining the value of developing bias voltage according to said latest difference so that a correct duplicated image may be produced.

3. The method as set forth in claim 2, which comprises setting the developing bias voltage slightly higher than the potential of an latent image corresponding to the background of a copy, and setting the upper limit of the developing bias voltage so that the developing bias voltage may not excessively increase even when the quantity of light reflected from the maximum reflection-factor area of the copy is small.

4. A method of maintaining correct the electrostatic latent image conditions of an electrophotographically duplicated image, which comprises [setting] *providing* a reference plate having two wide areas dark-tone and light tone, [said light tone area having a striped area consisting of black-tone stripes.] *setting said reference plate on a copy supporter together with an original copy so as to permit a duplicating process to proceed,* forming an electrostatic latent image of said reference plate on a photosensitive medium, detecting a potential of said electrostatic image corresponding to each area of said reference plate, and correcting [exposure, charge and flare] *the quantities of charge or of exposure* to [initial set conditions] *a predetermined condition* according to the detected potential of said electrostatic latent image thereby maintaining a correct electrostatic latent image of the copy so that a correct duplicated image may be produced.

5. A method of maintaining correct the developing bias voltage, charge, exposure and other conditions of a duplicated image in an electrophotographic process having charging and exposing steps for forming an electrostatic latent image on a photosensitive medium, which comprises setting a reference plate on a copy supporter together with an original copy so as to permit a duplicating process to proceed, said reference plate being provided with two areas of dark-tone and light-tone having a predetermined density difference therebetween, detecting the difference between the quantities of charge formed on the photosensitive medium by the action of said dark-tone and light-tone areas of said reference plate to control each condition of the duplicating process so that a correct duplicated image may be obtained.

6. A method according to claim 5 wherein the controlling step comprises:

varying a developing bias voltage to maintain a constant contrast between a high and low charged regions formed on the photosensitive medium by the dark-tone and light-tone areas in the event that further changes to the charging step are ineffective to maintain said constant contrast.

7. A method according to claim 5 wherein the controlling step comprises:

varying the amount of exposure to maintain a constant contrast between a high and low charge regions formed on the photosensitive medium by the dark-tone and light-tone areas in the event that further changes to said charging step are ineffective to maintain said constant contrast.

8. A method as claimed in claim 5, wherein the electrophotographic process is repeated such that the detection of the difference between the quantities of charge is made during a first electrophotographic process and a second process is started after the condition has been changed for the second process.

*9. A method of maintaining correct the electrostatic latent image conditions of an electrophotographically duplicated image, comprising:*

*providing a reference plate having a wide dark-tone area, a wide light-tone area, and a striped area.*

*setting said reference plate on a copy supporter together with an original copy so as to permit a duplicating process to proceed;*

*forming an electrostatic latent image of said reference plate on a photosensitive medium.*

*detecting respective potentials of portions of said electrostatic image corresponding to respective areas of said reference plate, and*

*correcting at least one duplicating process condition to a predetermined condition according to the detected potentials of said portions of said electrostatic latent image, thereby maintaining a correct electrostatic latent image of the copy so that a correct duplicated image may be produced.*

*wherein said correcting step comprises correcting an amount of charging and an amount of light exposure to respective predetermined conditions based on the detected potentials corresponding to said wide dark-tone and said wide light-tone areas, respectively.*

*10. A method according to claim 9, wherein said correcting step further comprises:*

*correcting an amount of flare produced by contamination of an optical system employed in forming the electrostatic image based on the detected potential corresponding to said striped area.*

*11. A method of maintaining correct the electrostatic latent image conditions of an electrophotographically duplicated image, comprising:*

*providing a reference plate having a wide dark-tone area, a wide light-tone area, and a striped area.*

*setting said reference plate on a copy supporter together with an original copy so as to permit a duplicating process to proceed.*

*forming an electrostatic latent image of said reference plate on a photosensitive medium.*

*detecting respective potentials of portions of said electrostatic image corresponding to respective areas of said reference plate, and*

*correcting at least one duplicating process condition to a predetermined condition according to the detected potentials of said portions of said electrostatic latent image, thereby maintaining a correct electrostatic latent image of the copy so that a correct duplicated image may be produced.*

*wherein said correcting step comprises correcting an amount of flare produced by contamination of an optical system employed in forming the electrostatic image based on the detected potential corresponding to said striped area.*

*12. A method of maintaining correct the electrostatic latent image conditions of an electrophotographically duplicated image, comprising:*

*providing a reference plate having two wide areas dark-tone, light-tone and a striped area.*

*setting said reference plate on a copy supporter together with an original copy so as to permit a duplicating process to proceed.*

*forming an electrostatic latent image of said reference plate on a photosensitive medium.*

*detecting a potential of said electrostatic image corresponding to each area of said reference plate, and*

*detecting optical system contamination according to the detected potential of said electrostatic latent image thereby maintaining a correct electrostatic latent image of the copy so that a correct duplicated image may be produced.*

• • • • •